(12) United States Patent
Walker et al.

(10) Patent No.: US 12,074,627 B2
(45) Date of Patent: Aug. 27, 2024

(54) TRANSCEIVER FOR A USER STATION OF A SERIAL BUS SYSTEM AND METHOD FOR COMMUNICATING IN A SERIAL BUS SYSTEM

(71) Applicant: Robert Bosch GmbH, Stuttgart (DE)

(72) Inventors: Steffen Walker, Reutlingen (DE); Felix Lang, Reutlingen (DE)

(73) Assignee: ROBERT BOSCH GMBH, Stuttgart (DE)

( * ) Notice: Subject to any disclaimer, the term of this patent is extended or adjusted under 35 U.S.C. 154(b) by 0 days.

(21) Appl. No.: 17/830,595

(22) Filed: Jun. 2, 2022

(65) Prior Publication Data

US 2022/0393715 A1 Dec. 8, 2022

(30) Foreign Application Priority Data

Jun. 7, 2021 (DE) ..................... 10 2021 205 719.5

(51) Int. Cl.
*H04B 1/40* (2015.01)
*H04L 12/40* (2006.01)

(52) U.S. Cl.
CPC .......... *H04B 1/40* (2013.01); *H04L 12/40006* (2013.01)

(58) Field of Classification Search
CPC ............. H04B 1/38; H04B 1/40; H04B 1/401
USPC ........ 375/219, 220, 222, 257; 370/451, 452, 370/463; 455/14, 39, 60, 73
See application file for complete search history.

(56) References Cited

U.S. PATENT DOCUMENTS

| | | | | |
|---|---|---|---|---|
| 8,989,210 B2 * | 3/2015 | Hartwich | .......... | H04L 12/40039 370/458 |
| 2009/0213915 A1 * | 8/2009 | Wagner | .................. | H04L 12/12 375/220 |
| 2010/0293315 A1 | 11/2010 | Hartwich | | |
| 2014/0129748 A1 | 5/2014 | Muth | | |
| 2014/0215109 A1 | 7/2014 | Hopfner | | |
| 2020/0160629 A1 * | 5/2020 | Walker | ............. | H04L 12/40169 |
| 2020/0382340 A1 | 12/2020 | Muth | | |

FOREIGN PATENT DOCUMENTS

| | | | | |
|---|---|---|---|---|
| DE | 102019207174 A1 * | 11/2020 | ....... | H04L 12/40032 |
| WO | 2020142200 A1 | 7/2020 | | |

* cited by examiner

*Primary Examiner* — Young T. Tse
(74) *Attorney, Agent, or Firm* — NORTON ROSE FULBRIGHT US LLP; Gerard A. Messina

(57) ABSTRACT

A transceiver for a user station of a serial bus system. The transceiver has a transmit module for sending a transmit signal onto a bus of the bus system; a receive module for receiving the signal from the bus and designed to generate a digital receive signal from the received signal; and a communication module for determining the communication standard according to which the messages are exchanged between user stations of the bus system. The communication module has a block with which the communication standard for the transmit module and the receive module is able to be changed from a first communication standard to a second communication standard, so that the transmit module and the receive module are implemented either according to a first communication standard or according to a second communication standard.

15 Claims, 3 Drawing Sheets

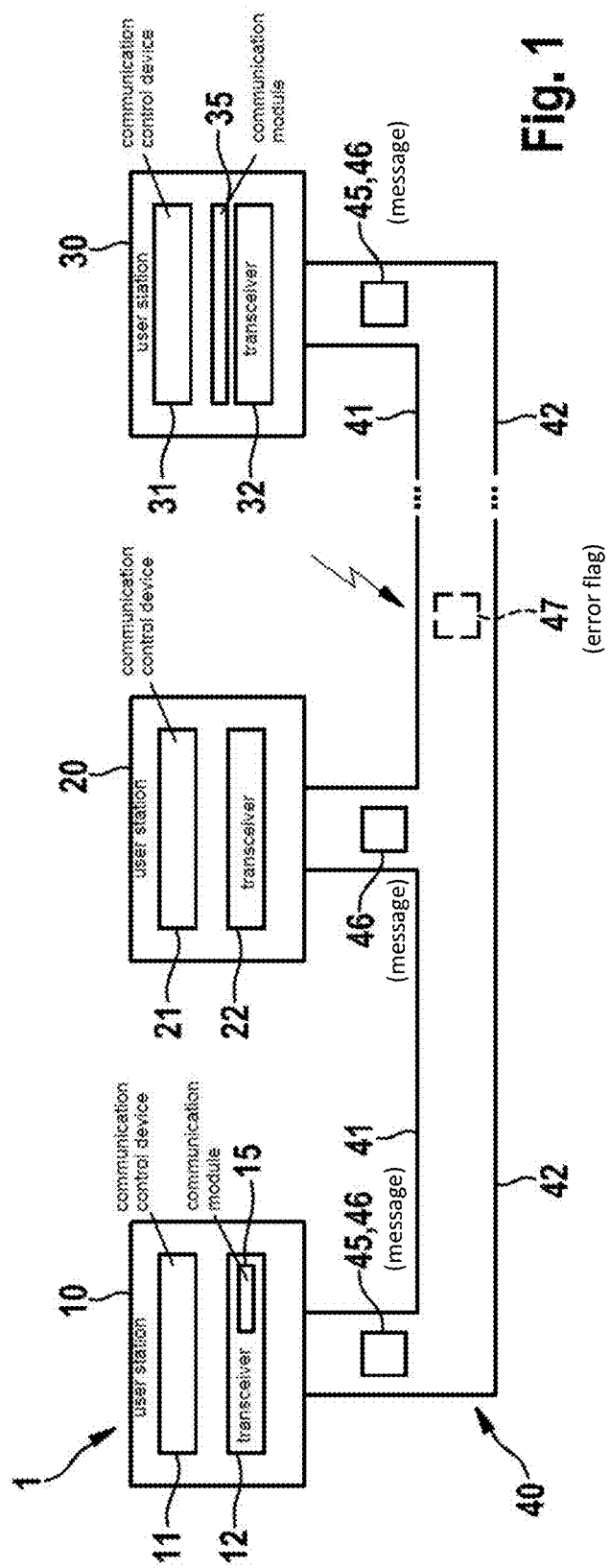
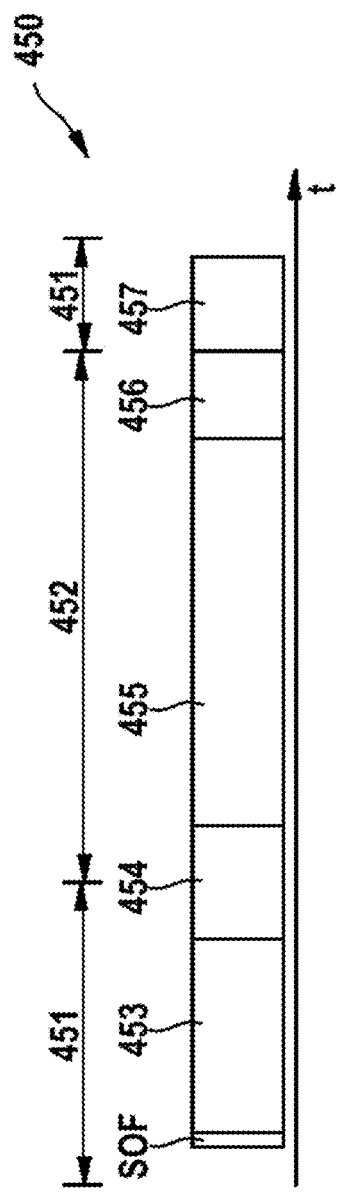

TRANSCEIVER FOR A USER STATION OF A SERIAL BUS SYSTEM AND METHOD FOR COMMUNICATING IN A SERIAL BUS SYSTEM

CROSS REFERENCE

The present application claims the benefit under 35 U.S.C. § 119 of German Patent Application No. DE 10 2021 205 719.5 filed on Jun. 7, 2021, which is expressly incorporated herein by reference in its entirety.

FIELD

The present invention relates to a transceiver for a user station of a serial bus system and a method for communicating in a serial bus system.

BACKGROUND INFORMATION

Bus systems are used for the communication between sensors and electronic control units in technical systems for many different applications. In particular, bus systems are utilized in vehicles. Depending on the application, it is required or essential that the data be transmitted with the highest possible data-transmission rate from the transmitter to the receiver.

In the case of vehicles, a bus system in which data are transmitted as messages in the Standard ISO 11898-1:2015 as controller area network (CAN) protocol specification with CAN flexible data-rate (CAN FD) is presently in the introductory phase. The messages are transmitted between the users of the bus system such as sensor, electronic control unit, transducer, etc. To this end, the message is sent onto the bus in a frame in which there is a switchover between two communication phases. In the first communication phase (arbitration), a negotiation takes place as to which of the user stations of the bus system is allowed to send its frame onto the bus in the next second communication phase (data phase, that is, transmission of the payload). CAN FD is utilized in the vehicle by most manufacturers in the first step with 500 kbit/s arbitration bit rate and 2 Mbit/s data bit rate. Thus, it is necessary to switch between a slow operating mode and a fast operating mode when transmitting on the bus.

In order to enable even greater data rates in the second communication phase, there are successor bus systems for CAN FD such as CAN signal improvement capability (CAN-SIC) and CAN extra long (CAN XL), for instance. In the case of CAN-SIC according to the Standard CiA601-4, a data bit rate of approximately 5 to 8 Mbit/s is able to be achieved. In the case of CAN XL, the data rate may be in a range of approximately 5 to 20 Mbit/s, the standards for that currently being established at the organization CAN in Automation (CiA) (CiA610-3). In addition to the pure transport of data over the CAN bus, CAN XL is also intended to support other functions such as functional safety, data security and quality of service (QOS). These are elementary features which are needed in an autonomously driving vehicle.

The problem arises when new user stations which are intended to operate with greater data-transmission rates than previously are to be connected to the bus system. Such a change of the bus system often requires an exchange of all technical devices for the communication in the bus system. This is costly and is often undesirable in terms of the careful use of resources.

SUMMARY

An object of the present invention is to provide a transceiver for a user station of a serial bus system and a method for communicating in a serial bus system, which solve the problems indicated above. In particular, an object of the present invention is to provide a transceiver for a user station of a serial bus system and a method for communicating in a serial bus system, with which an inexpensive increase in the maximum data-transmission rate in the bus system is able to be realized, accompanied by great flexibility and error robustness of the communication.

The objective may be achieved by a transceiver for a user station of a serial bus system having the features of the present invention. In accordance with an example embodiment of the present invention, the transceiver has a transmit module for sending a transmit signal onto a bus of the bus system, in which bus system at least a first communication phase and a second communication phase are used for the exchange of messages between user stations of the bus system; a receive module for receiving the signal from the bus, the receive module being designed to generate a digital receive signal from the signal received from the bus; and a communication module for determining the communication standard according to which the messages are exchanged between user stations of the bus system, the communication module having at least one block with which the communication standard for the transmit module and the receive module is able to be changed from a first communication standard to a second communication standard, so that the transmit module and the receive module are implemented either according to a first communication standard for transmitting and/or receiving messages or according to a second communication standard for transmitting and/or receiving messages.

The form of the transceiver described above makes it possible to adapt the transmission features of the transceiver for a bus system as needed. In this context, a change between different communication standards is possible without exchanging the communication devices of the bus system. This permits particularly beneficial handling of resources. At the same time, it is also possible to integrate the previously described transceiver into an application-specific integrated circuit (ASIC). As of a certain degree of utilization, this brings with it enormous economic advantages such as smaller circuitry, less space required, better integration and thus cost saving as well as easier practical application. Moreover, one and the same ASIC may also be used for years, without having to sacrifice future ability to increase the data rate in a bus system. Thus, it is possible to benefit from the advantage of integrating the transceiver into the ASIC, even if it takes 3 to 5 years to redesign an ASIC from the start of development up to its introduction into the field, for example, and the communication standard for a bus system has already changed in this time and/or a faster communication is needed. In other words, the transceiver described is very advantageous as a "combination product" if, now or in the future, in selecting the CAN transceiver, the ECU manufacturers must decide for one of at least two standards, particularly for one of the standards CAN-FD or CAN-SIC or CAN-XL. For example, it is cost-effective for ECU manufacturers to use an ASIC with integrated stand-alone transceiver. In this context, the transceiver described gives the ECU manufacturers flexibility with respect to the type (CAN-FD or CAN-SIC or CAN-XL) of the CAN transceiver module.

Moreover, the form of the transceiver described above enables the blocks to resolve contradictory requirements for configuration standards. Namely, for example, the circuitry parts additionally necessary for the CAN-SIC functionality and their parasitic capacitance preclude compliance with the requirement as to the maximum connection capacitance of the bus lines which are needed for other CAN variants.

Thus, the transceiver may be adapted very inexpensively to the respective requirements in a serial bus system, particularly in the case of CAN FD or CAN SIC or CAN XL, with great flexibility for the reaction to changing requirements of the communication. As a consequence, a communication with adjusted, especially increased, data-transmission rate and nevertheless low error rate is possible, according to need. As a result, a very robust communication with low space requirements and high integration rate for the necessary hardware may thus be realized. In particular, if needed, it is possible to transmit messages with a first communication standard or communication protocol, especially CAN FD, and as required, to switch over in order to transmit messages with a second communication standard or communication protocol, especially CAN-SIC or CAN XL.

In addition, the described adjustment of the transmission features of the transceiver makes it possible, if necessary, to transmit the data with a higher data transmission rate, without thereby reducing the error robustness of the communication in the bus system.

Even given increased data-transmission rates for the payload of the message, in a first communication phase, the transceiver is able to maintain an arbitration from CAN.

The transceiver may also be used when at least one CAN user station and/or at least one CAN FD user station is/are also present in the bus system, which transmit messages according to the CAN protocol and/or CAN FD protocol.

Further advantageous refinements of the transceiver are disclosed herein.

In one development of the present invention, the transmit module is implemented according to the first communication standard to send a message onto the bus with the same physical layer in all communication phases.

In one development of the present invention, the at least one block is designed to implement the transmit module according to the second communication standard in such a way that in a communication phase for transmitting the payload of the message, the bits are propelled onto the bus with a bit time which is less than a bit time of bits which the transmit module propels onto the bus according to the first communication standard in the communication phase for transmitting the payload of the message.

In one refinement of the present invention, the at least one block is designed to alter the transmit module according to the third communication standard in such a way that at least in a first communication phase of the message, a different physical layer is used for the signal to be sent onto the bus than in a second communication phase.

In addition, the transceiver may have at least one connection for receiving a signal to activate or deactivate the at least one block.

The communication module may be designed to change the communication standard for the transmit module and the receive module by programming of the at least one block in operation.

Possibly, the communication module is designed to change the communication standard for the transmit module and the receive module by programming of the at least one block using series testing techniques.

In accordance with an example embodiment of the present invention, the communication module may be designed in such a way that the communication standard for the transmit module and the receive module is able to be changed by mask modification upon incorporation of the at least one block into an application-specific integrated circuit.

Optionally, in the case of each of the communication standards, a negotiation is carried out in the first communication phase as to which of the user stations of the bus system will receive at least temporary exclusive collision-free access to the bus in the following second communication phase.

In one special development of the present invention, the first communication standard is CAN FD, the second communication standard being CAN SIC and the third communication standard being CAN XL.

The transceiver described above may be integrated into an application-specific integrated circuit which is designed for the execution of a practical application of a technical system. In particular, the technical system is a vehicle and the application is a control for special functions to operate the vehicle.

The transceiver described above may be part of a user station for a serial bus system, the user station additionally having a communication control device for controlling a communication of the user station with at least one other user station of the bus system and for generating the transmit signal for sending onto the bus of the bus system and/or for receiving a signal from the bus, the transceiver being designed to convert the transmit signal into at least one analog signal for sending onto the bus and to receive the at least one analog signal from the bus.

The user station described above may be part of a bus system which additionally includes a bus and at least two user stations that are connected to each other via the bus in such a way that they are able to communicate serially with each other. In this context, at least one of the at least two user stations is a user station described above.

In addition, the previously stated object is achieved by a method for communicating in a serial bus system according to the present invention. In accordance with an example embodiment of the present invention, the method may be carried out using a transceiver for a user station of a bus system, the method having the following steps: sending, by a transmit module, of a transmit signal onto a bus of the bus system, in which bus system at least a first communication phase and a second communication phase are used for the exchange of messages between user stations of the bus system; receiving, by a receive module, of the signal from the bus, the receive module being designed to generate a digital receive signal from the signal received from the bus; and determining, by a communication module, the communication standard according to which the messages are exchanged between user stations of the bus system, the communication module having at least one block with which the communication standard for the transmit module and the receive module is set from a first communication standard to a second communication standard, so that the transmit module and the receive module operate according to the first communication standard set for transmitting and/or receiving messages or according to the second communication standard set for transmitting and/or receiving messages.

The method provides the same advantages as indicated previously with regard to the transceiver.

Additional possible implementations of the present invention also include combinations, not explicitly named, of features or variants described above or in the following with respect to the exemplary embodiments. Moreover, one skilled in the art will also add individual aspects as improvements of or additions to the respective basic form of the present invention, in view of the disclosure herein.

BRIEF DESCRIPTION OF THE DRAWINGS

In the following, the present invention is described in greater detail with reference to the accompanying drawing and with the aid of exemplary embodiments.

FIG. 1 shows a simplified block diagram of a bus system according to a first exemplary embodiment of the present invention.

FIG. 2 shows an illustration for clarifying the structure of a message which may be transmitted by a user station of the bus system according to the first exemplary embodiment of the present invention.

Insofar as nothing different is indicated, identical or functionally identical elements are provided with the same reference numerals in the figures.

DETAILED DESCRIPTION OF EXAMPLE EMBODIMENTS

Figure 3:
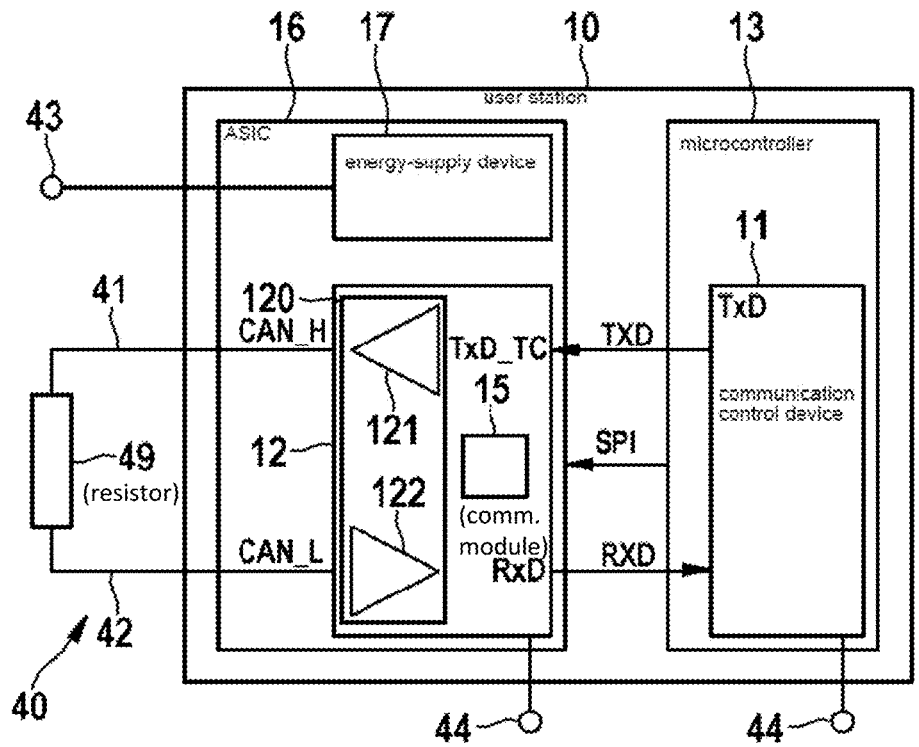
FIG. 3 shows a simplified schematic block diagram of a user station of the bus system according to the first exemplary embodiment of the present invention.

As example, FIG. 1 shows a bus system 1 that in particular, is designed basically for a CAN bus system, a CAN FD bus system, a CAN XL bus system and/or modifications thereof, as described in the following. Bus system 1 may be used in a vehicle, especially a motor vehicle, an aircraft and so forth, or in a hospital, etc.

In FIG. 1, bus system 1 has a plurality of user stations 10, 20, 30, each of which is connected to a bus 40 by a first bus wire 41 and a second bus wire 42. Bus wires 41, 42 may also be called CAN_H and CAN_L or CAN-FD_H and CAN-FD_L or CAN-XL_H and CAN-XL_L, and are used for the electrical signal transmission after coupling of the dominant levels or generating of recessive levels or other levels for a signal in the transmit mode.

According to FIG. 1, messages 45, 46 in the form of signals are potentially transmittable serially over bus 40 between individual user stations 10, 20, 30. If an error occurs during the communication on bus 40, as represented by the zigzaggy black block arrow in FIG. 1, optionally an error flag 47 may be sent. For example, user stations 10, 20, 30 are electronic control units, sensors, display devices, etc., of a motor vehicle.

As shown in FIG. 1, user station 10 has a communication control device 11, a transceiver 12 and a communication module 15. User station 20 has a communication control device 21, a transceiver 22. User station 30 has a communication control device 31, a transceiver 32, and a communication module 35. Transceivers 12, 22, 32 of user stations 10, 20, 30 are each connected directly to bus 40, even if this is not illustrated in FIG. 1.

Communication control devices 11, 21, 31 are used in each case to control a communication of respective user station 10, 20, 30 over bus 40 with at least one other user station of user stations 10, 20, 30, which are connected to bus 40.

Communication control devices 11, 31 create and read first messages 45, which are modified CAN messages 45, for example. In this case, modified CAN messages 45 are constructed based on the CAN SIC format or the CAN XL format, for instance. The CAN XL format is described in greater detail with reference to FIG. 2. In addition, communication control devices 11, 31 may be implemented to provide for or to receive from transceiver 12, 32 a modified CAN message 45 or a CAN FD message 46, according to need. Thus, communication control devices 11, 31 create and read a first message 45 or second message 46, first and second messages 45, 46 differing from each other owing to their data-transmission standard, namely, in this case, CAN XL or CAN SIC or CAN FD.

Communication control device 21 may be implemented like a conventional CAN controller according to ISO 11898-1:2015, that is, like a classic CAN controller tolerant of CAN FD, or like a CAN FD controller. Communication control device 21 creates and reads second messages 46, e.g., CAN FD-messages 46. A number of 0 to 64 data bytes may be included in CAN FD-messages 46, which what is more, are transmitted with a markedly faster data rate than in the case of a classic CAN message. In particular, communication control device 21 is implemented like a conventional CAN FD-controller.

Transceiver 22 may be implemented like a conventional CAN transceiver according to ISO 11898-1:2015 or a CAN FD transceiver. Transceivers 12, 32 may be implemented to provide for or to receive from associated communication control device 11, 31, messages 45 according to the CAN XL-format or messages 46 according to the current CAN FD-format or CAN SIC-format, as needed.

With the two user stations 10, 30, formation and then transmission of messages 45 with different CAN formats, particularly the CAN FD format or the CAN SIC format or the CAN XL format as well as the reception of such messages 45 are able to be realized, as described in greater detail below.

FIG. 2 shows a frame 450 for message 45, which specifically is a CAN XL frame as provided by communication control device 11 for transceiver 12 to send onto bus 40. In this context, in the present exemplary embodiment, communication control device 11 creates frame 450 to be compatible with CAN FD. The same holds true analogously for communication control device 31 and transceiver 32 of user station 30. Alternatively, frame 450 is a CAN SIC frame.

According to FIG. 2, frame 450 for the CAN communication on bus 40 is subdivided into different communication phases 451, 452, namely, an arbitration phase 451 (first communication phase) and a data phase 452 (second communication phase). After a start bit SOF, frame 450 has an arbitration field 453, a control field 454, a data field 455, a checksum field 456 and a frame termination field 457.

In arbitration phase 451, with the aid of an identifier (ID) with, e.g., bits ID28 to ID18, a negotiation is carried out bit-by-bit in arbitration field 453 between user stations 10, 20, 30 as to which user station 10, 20, 30 would like to transmit message 45, 46 with the highest priority and therefore receive exclusive access to bus 40 of bus system 1 for the next time for transmitting in subsequent data phase 452. A physical layer like in the case of CAN and CAN-FD is used in arbitration phase 451. The physical layer corresponds to the physical layer or layer 1 of the familiar OSI model (open systems/interconnection model).

An important point during phase 451 is that the conventional CSMA/CR method is used, which allows simultaneous access of user stations 10, 20, 30 to bus 40 without higher-prioritized message 45, 46 being destroyed. As a consequence, further bus-user stations 10, 20, 30 may be added to bus system 1 relatively easily, which is very advantageous.

The CSMA/CR method requires that there be so-called recessive states on bus 40, which are able to be overwritten by other user stations 10, 20, 30 with dominant levels or dominant states on bus 40. In the recessive state, high-resistance conditions prevail at individual user stations 10, 20, 30, which in combination with the parasitics of the bus wiring, result in longer time constants. This leads to a limitation of the maximum bit rate of today's CAN FD physical layer to, at present, approximately 2 megabits per second during actual use in a vehicle.

In addition to a part of control field 454, the payload of the CAN XL frame, that is, of message 45 from data field 455 as well as checksum field 456 are transmitted in data phase 452.

Checksum field 456 may contain a checksum concerning the data of data phase 452 including the stuffing bits which in each case are inserted as inverse bit by the sender of message 45 after a predetermined number of identical bits, particularly 10 identical bits. At the end of data phase 452, there is a switch back again to arbitration phase 451.

At least one acknowledge bit may be included in an end field in frame termination field 457. In addition, a sequence of 11 identical bits may be provided, which indicate the end of CAN XL frame 450. With the at least one acknowledge bit, it may be reported whether or not a receiver has discovered an error in received CAN XL frame 450, that is, in message 45.

A sender of message 45 begins sending bits of data phase 452 onto bus 40 only when user station 10 has won the arbitration as the sender and user station 10 as sender therefore has an exclusive access to bus 40 of bus system 1 for transmitting.

In a bus system with CAN XL or CAN SIC, proven features are adopted which are responsible for the robustness and user-friendliness of CAN and CAN FD, especially frame structure with identifier and arbitration according to the CSMA/CR method. Thus, in arbitration phase 451, as first communication phase user station 10 utilizes in part—particularly up to and including the FDF bit—a format according to ISO 11898-1:2015 from CAN/CAN-FD. However, in comparison to CAN or CAN FD, an increase in the net data-transmission rate, particularly to approximately 10 megabits per second, is possible in data phase 452 as second communication phase. In addition, an increase in the volume of the payload data per frame, particularly to approximately 2 kilobytes or any other value, is possible.

FIG. 3 shows the basic structure of user station 10 having communication control device 11 and transceiver 12. Except for the differences indicated above, user stations 20, 30 are constructed in the same way in terms of the basic structure as shown in FIG. 3. Therefore, user stations 20, 30 are not described separately.

According to FIG. 3, in addition to communication control device 11 and transceiver 12, user station 10 has a microcontroller 13, to which communication control device 11 is assigned, and a system ASIC 16 (ASIC=application-specific integrated circuit) which alternatively, may be a system basis chip (SBC) or a stand-alone transceiver, on which multiple functions necessary for an electronic assembly of user station 10 are aggregated. For example, system-ASIC 16 is or has a circuit for safety-related functions of a technical system, especially of a vehicle. Such safety-related functions of a vehicle are, in particular, a collision detection, a brake-lane assistant, a light control, a rearview-camera control, a fluid-level indicator, especially of hydraulic oil for a brake system, washer fluid for a windshield washer system, a motor-oil-pressure detection, etc. For example, system-ASIC 16 is or has a circuit for comfort-related functions of a technical system, especially of a vehicle. Such comfort-related functions of a vehicle are, in particular, a navigation control, a parking-assist system, an automatically controlled wiper system, etc. More generally, system-ASIC 16 has a circuit or circuitry parts for a practical application of the vehicle, particularly for a control for special functions to operate the vehicle.

In addition to transceiver 12, an energy-supply device 17 which supplies transceiver 12 with electrical energy is integrated in system-ASIC 16. Energy-supply device 17 usually furnishes a voltage CAN supply of 5 V. However, energy-supply device 17 may supply a different voltage with a different value, as needed. Additionally or alternatively, energy-supply device 17 may take the form of a current source.

Transceiver 12 has a transmit/receive block 120 having a transmit module 121 and a receive module 122. In addition, transceiver 12 has communication module 15 which, utilizing an SPI connection between microcontroller 13 and ASIC 16, is described in greater detail in connection with FIG. 6.

Even though the discussion in the following is always of transceiver 12, as an alternative, it is possible to provide receive module 122 in a separate device, external of transmit module 121. Transmit module 121 and receive module 122 may be constructed like in the case of a conventional transceiver 22. In particular, transmit module 121 may have at least one operational amplifier and/or a transistor. In particular, receive module 122 may have at least one operational amplifier and/or a transistor.

Transceiver 12 is connected to bus 40, more precisely, its first bus wire 41 for CAN_H or CAN-XL_H and its second bus wire 42 for CAN_L or CAN-XL_L. The voltage supply for energy-supply device 17 to supply first and second bus wires 41, 42 with electrical energy, especially with the voltage CAN supply, is accomplished via at least one connection 43. The connection to ground, that is, CAN_GND, is realized via a connection 44. First and second bus wires 41, 42 are terminated with a terminating resistor 49.

First and second bus wires 41, 42 are connected in transceiver 12 not only to transmit module 121, which is also referred to as transmitter, but also to receive module 122, which is also referred to as receiver, even though the connection is not shown in FIG. 3 for simplification.

Figure 4:
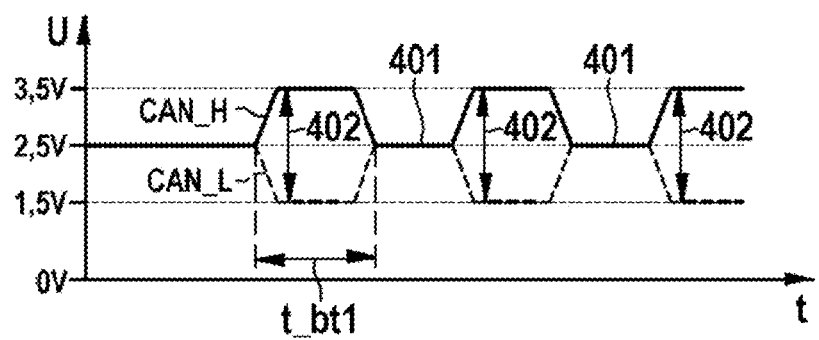
FIG. 4 shows a time characteristic of bus signals CAN-XL_H and CAN-XL_L in the case of the user station according to the first exemplary embodiment of the present invention.

During operation of bus system 1, transmit module 121 is able to convert a transmit signal TXD or TxD of communication control device 11 into corresponding signals for bus wires 41, 42, particularly the signals CAN-FD_H and CAN-FD_L, and send these signals at the connections for CAN_H and CAN_L onto bus 40, as shown in FIG. 4.

Figure 5:
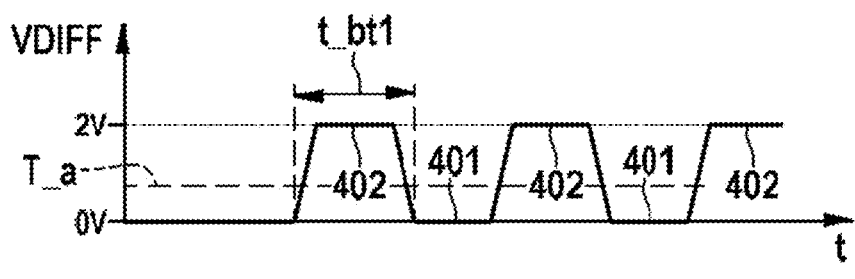
FIG. 5 shows a time characteristic of a differential voltage VDIFF of bus signals CAN-XL_H and CAN-XL_L in the case of the user station according to the first exemplary embodiment of the present invention.

From signals received from bus 40, particularly the signals CAN-FD_H and CAN-FD_L, according to FIG. 4, receive module 122 forms a receive signal RXD or RxD and passes it on to communication control device 11, as shown in FIG. 3. With the exception of an idle state or standby state, utilizing receive module 122, transceiver 12 during normal operation is always listening to a transmission of data or messages 45, 46 on bus 40, and indeed, regardless of whether or not transceiver 12 is the sender of message 45, 46. According to the example of FIG. 4, at least in arbitration phase 451, signals CAN-FD_H and CAN-FD_L for CAN FD or CAN SIC as well as signals CAN-XL_H, CAN-XL_L have the dominant and recessive bus levels 401, 402, as from CAN. A differential signal VDIFF=CAN-FD_H−CAN-FD_L or VDIFF=CAN-XL_H−CAN-XL_L forms on bus 40, which is shown in FIG. 5 for arbitration phase 451. The individual bits of signal VDIFF having the bit time t_bt1 are able to be recognized in arbitration phase 451 with a receive threshold T_a of 0.7 V, for example. In data phase 452, the bits in the case of CAN FD, CAN SIC, CAN XL are transmitted faster, thus, with a shorter bit time t_bt2, than in arbitration phase 451. Therefore, in data phase 452, signals CAN-FD_H and CAN-FD_L as well as CAN-XL_H and CAN-XL_L differ, at least in their faster bit rate, from the conventional signals CAN_H and CAN_L.

The sequence of states 401, 402 for the signals of FIG. 4 and the characteristic of voltage VDIFF of FIG. 5 resulting from it are used only to illustrate the function of user station 10. The sequence of the data states for bus states 401, 402 is selectable according to need.

In other words, when transmit module 121 is switched to a first operating mode B_451 (SLOW), according to FIG. 4 it generates a first data state as bus state 402 with different bus levels for two bus wires 41, 42 of the bus line and a second data state as bus state 401 with the same bus level for the two bus wires 41, 42 of the bus line of bus 40.

Furthermore, for the time characteristics of signals CAN-XL_H, CAN-XL_L in a second operating mode B_452_TX (FAST_TX), which includes data phase 452, transmit module 121 sends the bits with a higher bit rate onto bus 40. In addition, in data phase 452, the CAN-XL_H and CAN-XL_L signals may be generated with a different physical layer than in the case of CAN FD. Thus, the bit rate in data phase 452 may be increased even more than in the case of CAN FD. A user station which is not a transmitter of frame 450 in data phase 452 sets a third operating mode B_452_RX (FAST_RX) in its transceiver.

Figure 6:
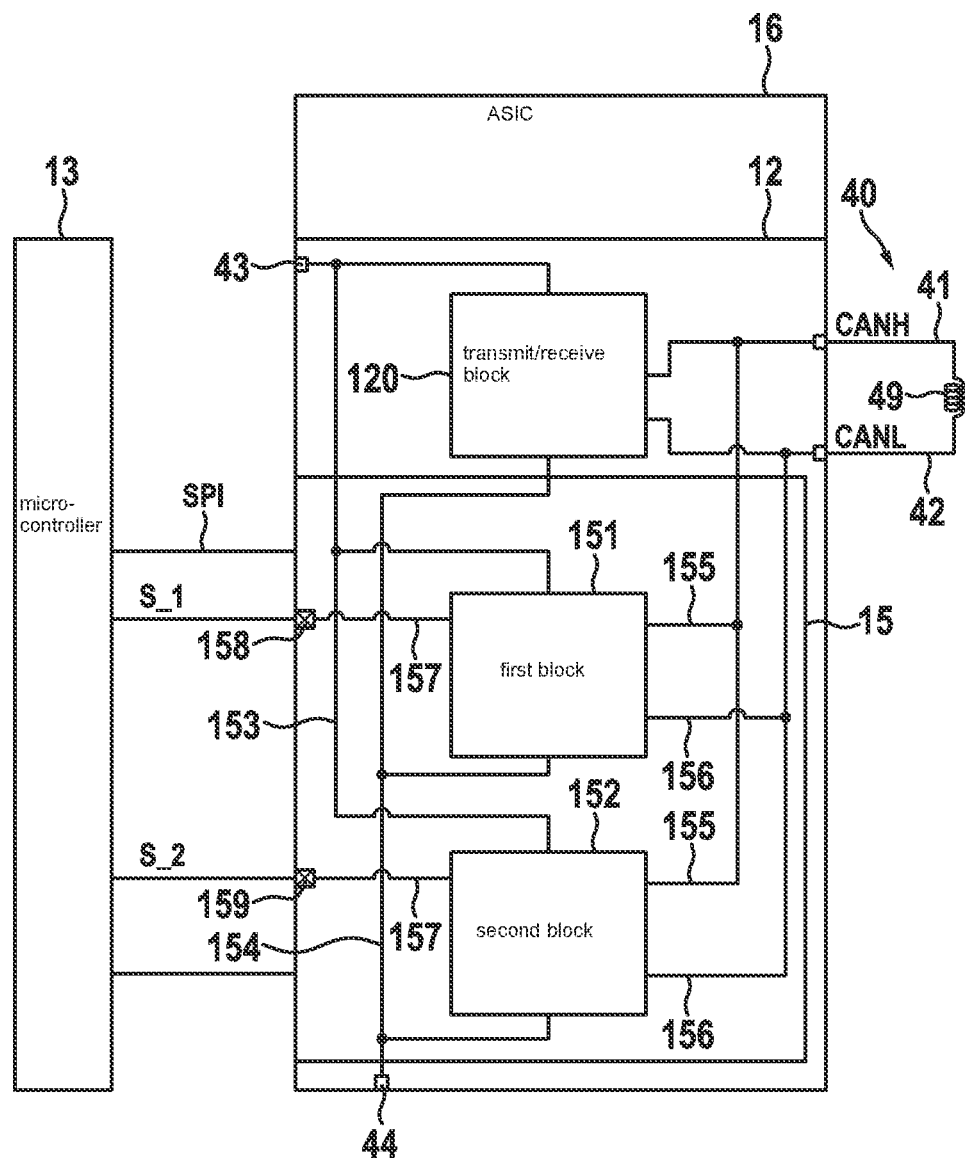
FIG. 6 shows a simplified circuit diagram of a transceiver for a bus system according to the first exemplary embodiment of the present invention.

FIG. 6 shows transceiver 12 more precisely in relation to communication module 15 from FIG. 3. Communication module 15 is connected between transmit/receive module 120 and connection 44 for ground. Communication module 15 and transmit/receive module 120 are supplied with electric voltage via connection 43.

Transmit/receive module 120 is configured for communication according to a first communication standard. In particular, the communication standard is CAN FD. Thus, transmit/receive module 120 is able to transmit messages 46 as standard over bus 40.

Communication module 15 has a first block 151, a second block 152, a first connection line 153 for the connection to electric voltage supply 43, a second connection line 154 for the connection to ground, first bus-connection lines 155, second bus-connection lines 156, control lines 157, a first control connection 158 and a second control connection 159.

First block 151 is connected at its input to first connection line 153, and is thus supplied with electric voltage from connection 43. Moreover, first block 151 is connected to second connection line 154, and thus to ground. In addition, first block 151 is connected via one of control lines 157 to first control connection 158. First block 151 contains components which, in combination with the components of transmit/receive module 120, configure transceiver 12 for communication according to a second communication standard. Block 151 is also connected at its output to bus-connection lines 155, 156. Thus, a signal for bus wires 41, 42 is propelled from the outputs of first block 151 via bus-connection lines 155, 156 onto bus 40. In particular, first block 151 may be a CAN-SIC block. In this case, first block 151 contains components which ensure that transceiver 12 is configured for communication according to the CAN-SIC communication standard.

Second block 152 is connected at its input to first connection line 153, and is thus supplied with electric voltage from connection 43. Moreover, second block 152 is connected to second connection line 154, and thus to ground. In addition, second block 152 is connected via one of control lines 157 to second control connection 158. Second block 152 contains components which, in combination with the components of transmit/receive module 120, configure transceiver 12 for communication according to a third communication standard. Block 152 is also connected at its output to bus-connection lines 155, 156. Thus, a signal for bus wires 41, 42 is propelled from the outputs of second block 152 via bus-connection lines 155, 156 onto bus 40. In particular, second block 152 may be a CAN-XL block. In this case, second block 152 contains components which ensure that transceiver 12 is configured for communication according to the CAN-XL communication standard.

First and second control connection 158, 159 are provided and interconnected for one configuration of transceiver 12. In order to configure transceiver 12 for executing the functions of first block 151, a signal S_1 is fed into first control connection 158. Switching signal S_1 determines whether the functions of first block 151 should be activated or deactivated.

In order to configure transceiver 12 for the execution of the functions of second block 152, a signal S_2 is fed into second control connection 159. Switching signal S_2 determines whether the functions of first block 152 should be activated or deactivated. Signal S_1 may be transmitted via the SPI connection to transceiver 12. Signal S_2 may be transmitted via the SPI connection to transceiver 12.

The following possibilities exist for the configuration of transceiver 12.

According to a first possibility, the configuration may be carried out during operation of transceiver 12. For example, in this case, during system initialization, signal S_1 or S_2 is output by microcontroller 13 via the SPI connection to ASIC 16. Signal S_1 or signal S_2 is able to determine whether transceiver 12 should carry into effect the first communication standard or the second communication standard or the third communication standard. If transceiver 12 is intended to operate according to the first communication standard, then S_1=0 and S_2=0 applies, for example. If transceiver 12 is to operate according to the second communication standard, then S_1=1 and S_2=0 applies, for example. If transceiver 12 is to operate according to the third communication standard, then S_1=0 and S_2=1 applies, for example. Thus, the user, particularly the ECU applicator, of transceiver 12 is able to decide via software of microcontroller 13 or in ASIC 16, in which communication variant, especially CAN variant, transceiver 12 operates.

According to a second possibility, the configuration of transceiver 12 may be accomplished via programming of block 151, 152 to be utilized, using series testing techniques. For this, the procedure may be much the same as described in connection with the first possibility. In this way, transmit/ receive module 120 may initially be equipped with the CAN-FD functionality, for example. Module 120 is then connected later via programming to one of blocks 151, 152 using series testing techniques, in order to be transferred into a different communication variant, especially a more advanced CAN variant, e.g., into CAN SIC or CANXL, as described previously. This programming of block 151, 152 to be used utilizing signals S_1 and/or S_2 may be carried out via any IC interface. In particular, the SPI connection or at least one other pin which is usable in a test mode for the programming may be utilized for the programming. Alternatively, it is possible to have separate additional connections S1, S2 available in order to input signal(s) S_1 and/or S_2.

However, because of the additional pins, such a variant is very complicated and more cost-intensive than the variants indicated previously.

According to a third possibility, transceiver 12 may be configured via mask modification during the ASIC production. In the case of such a configuration, the unneeded circuitry parts of blocks 151, 152 and/or their lines 155, 156 are removed physically from bus lines 41, 42 of transceiver 12 by mask modification. This is very advantageous in that parasitics such as capacitance(s) and current paths, particularly unneeded lines 155, 156 which can be made conductive for the transmitting of messages 45, 46 during transient events, are thus reduced. Particularly good transmission features are thereby attainable for transceiver 12. In addition, for example, contradictory requirements for configuration standards may be resolved particularly well. For instance, it is possible to remove the circuitry parts additionally necessary for the CAN-SIC functionality and their parasitic capacitance, which preclude compliance with the requirement for the maximum connection capacitance of the bus lines that are needed for other CAN variants.

However, in the case of the third possibility of the configuration, it is no longer possible to switch over between communication standards during operation.

According to one modification of the previous description and/or the representation in FIG. 6, any other combinations, especially subsets of the functionalities of blocks 151, 152, are selectable by way of a different configuration(s). In particular, it is possible that functions are present which enable the communication of user stations 10, 20, 30 in a bus system, that operate according to different communication standards in bus system 1. Consequently, a portion of user stations 10, 30 are already able at least from time to time to exchange messages 45 with a greater data-transmission rate than other user stations 20.

According to yet another modification of the previous description and/or representation in FIG. 6, it is possible to interleave blocks 151, 152, especially at least a portion of the functionalities of blocks 151, 152, in the layout of the circuit of transceiver 12.

According to a further modification of the previous description and/or representation in FIG. 6, it is possible to implement at least a part of blocks 151, 152, especially at least a portion of the functionalities of blocks 151, 152, as software. In this case, for example, standardized hardware component parts already available on the market may be adapted for transceiver 12 and/or at least one of blocks 151, 152 may be adapted software-wise in order to realize the functions of the different communication standards described before in connection with the previous exemplary embodiments. The software-wise adaptation is markedly less complicated and consequently more time-saving and cost-effective than the implementation of all functions of the different communication standards by hardware.

Thus, communication module 15 is usable in order to carry out a method for configuring transceiver 12 for different communication standards. In addition, communication module 15 is usable to carry out a method for communicating in the bus system. Depending on the configuration of blocks 151, 152, none or at least one of blocks 151, 152 is used for the communication.

According to a second exemplary embodiment, transceiver 12 of FIG. 6 has only one of blocks 151, 152. Thus, the configuration of transceiver 12 is only able to be changed between two communication standards. The communication standard may be changed according to one of the possibilities as described in connection with the previous exemplary embodiment.

According to a third exemplary embodiment, transceiver 12 of FIG. 6 has more than the two blocks 151, 152. Thus, the configuration of transceiver 12 is able to be changed between more than three communication standards. In particular, one of blocks 151, 152 provides a subset of functions according to the CAN XL communication standard. The communication standard may be changed according to one of the possibilities as described in connection with the first exemplary embodiment.

All previously described embodiments of transceivers 12, 22, 32, of user stations 10, 20, 30 of bus system 1 and of the method carried out with them may be used individually or in all possible combinations. In particular, all features of the previously described exemplary embodiments and/or their modifications and/or refinements may be combined in any way desired. Additionally or alternatively, notably the following modifications are possible.

Even though the invention is described above using the CAN bus system as example, the invention may be employed in any communication network and/or communication method where two different communication phases are utilized, in which the bus states which are generated for the different communication phases differ. Notably, the invention is usable in developments of other serial communication networks such as 100 Base-T1 Ethernet, field-bus systems, etc.

In particular, bus system 1 according to the exemplary embodiments may be a communication network in which data are transmittable serially with two different bit rates. It is advantageous, but not an absolute requirement, that in bus system 1, an exclusive, collision-free access of one user station 10, 20, 30 to one shared channel is ensured at least for certain periods of time.

The number and placement of user stations 10, 20, 30 in bus system 1 of the exemplary embodiments is arbitrary. In particular, user station 20 may be omitted in bus system 1. It is possible that one or more of user stations 10 or 30 is/are present in bus system 1. It is possible that all user stations in bus system 1 are the same, thus, only user stations 10 or only user stations 20 or only user stations 30 are provided.

What is claimed is:

1. A transceiver for a user station of a bus system, the transceiver comprising:
   a transmit module configured to send a transmit signal onto a bus of the bus system, wherein in the bus system, at least a first communication phase and a second communication phase are used for the exchange of messages between the user station and at least one other user station of the bus system;

a receive module configured to receive a signal from the bus, the receive module being configured to generate a digital receive signal from the signal received from the bus; and
a communication module configured to determine communication standards according to which the messages are exchanged between the user station and the at least one other user station of the bus system,
wherein the communication module has at least one block with which a communication standard for the transmit module and the receive module is able to be changed from a first communication standard to a second communication standard, so that the transmit module and the receive module are implemented either according to the first communication standard for transmitting and/or receiving the messages or according to the second communication standard for transmitting and/or receiving the messages.

2. The transceiver as recited in claim 1, wherein the transmit module is implemented according to the first communication standard to send a message onto the bus with the same physical layer in the first and second communication phases.

3. The transceiver as recited in claim 1, wherein the at least one block is configured to implement the transmit module according to the second communication standard in such a way that in a communication phase for transmitting payloads of the messages, bits are propelled onto the bus with a bit time which is less than a bit time of bits which the transmit module propels onto the bus according to the first communication standard in the communication phase for transmitting the payloads of the messages.

4. The transceiver as recited in claim 1, wherein the at least one block is configured to alter the transmit module according to a third communication standard in such a way that at least in the first communication phase, a different physical layer is used for a signal to be sent onto the bus than in the second communication phase.

5. The transceiver as recited in claim 4, wherein the first communication standard is controller area network flexible data rate (CAN FD), the second communication standard is controller area network signal improvement capability (CAN SIC), and the third communication standard is controller area network extra long (CAN XL).

6. The transceiver as recited in claim 1, further comprising:
at least one connection coupled to the communication module and configured to receive a signal to activate or deactivate the at least one block.

7. The transceiver as recited in claim 1, wherein the communication module is configured to change the communication standard for the transmit module and the receive module by programming of the at least one block in operation.

8. The transceiver as recited in claim 1, wherein the communication module is configured to change the communication standard for the transmit module and the receive module by programming of the at least one block using series testing techniques.

9. The transceiver as recited in claim 1, wherein the communication module is configured in such a way that the communication standard for the transmit module and the receive module is able to be changed by mask modification upon incorporation of the at least one block into an application-specific integrated circuit.

10. The transceiver as recited in claim 1, wherein in the case of each of the first and second communication standards, a negotiation is carried out in the first communication phase as to which of the user station and the at least one other user station of the bus system will receive at least temporary exclusive collision-free access to the bus in the second communication phase.

11. The transceiver as recited in claim 1, wherein the first communication standard is controller area network flexible data rate (CAN FD) and the second communication standard is controller area network signal improvement capability (CAN SIC).

12. An application-specific integrated circuit into which a transceiver is integrated, the circuit being configured for execution of an application of a technical system, the transceiver being for a user station of a bus system, the transceiver comprising:
a transmit module configured to send a transmit signal onto a bus of the bus system, wherein in the bus system, at least a first communication phase and a second communication phase are used for the exchange of messages between the user station and at least one other user station of the bus system;
a receive module configured to receive a signal from the bus, the receive module being configured to generate a digital receive signal from the signal received from the bus; and
a communication module configured to determine communication standards according to which the messages are exchanged between the user station and the at least one other user station of the bus system,
wherein the communication module has at least one block with which a communication standard for the transmit module and the receive module is able to be changed from a first communication standard to a second communication standard, so that the transmit module and the receive module are implemented either according to the first communication standard for transmitting and/or receiving the messages or according to the second communication standard for transmitting and/or receiving the messages, and
wherein the transceiver is configured to convert the transmit signal into at least one analog transmit signal for sending onto the bus.

13. A user station for a bus system, comprising:
a communication control device configured to control a communication of the user station with at least one other user station of the bus system and to: (i) generate a transmit signal for sending onto a bus of the bus system and (ii) receive a digital receive signal based on a signal from the bus; and
a transceiver including:
a transmit module configured to send the transmit signal from the communication control device onto the bus of the bus system, wherein in the bus system, at least a first communication phase and a second communication phase are used for the exchange of messages between the user station and the at least one other user station of the bus system,
a receive module configured to receive the signal from the bus, the receive module being configured to generate for the communication control device the digital receive signal based on the signal received from the bus, and
a communication module configured to determine communication standards according to which the messages are exchanged between the user station and the at least one other user station of the bus system, wherein the communication module has at least one block with which a communication standard for the transmit module and the receive module is able to be changed from a first communication standard to a second communication standard, so that the transmit module and the receive module are implemented either according to the first communication standard for transmitting and/or receiving the messages or according to the second communication standard for transmitting and/or receiving the messages, and wherein the transceiver is configured to convert the transmit signal into at least one analog transmit signal for sending onto the bus.

14. A bus system, comprising:

a bus; and at least two user stations that are connected to each other via the bus in such a way that they are able to communicate serially with each other, and of which at least one user station includes:
- a communication control device configured to control a communication of the at least one user station with at least one other user station of the bus system and to: (i) generate a transmit signal for sending onto the bus of the bus system and (ii) receive a signal from the bus; and
- a transceiver including:
  - a transmit module configured to send the transmit signal from the communication control device onto the bus of the bus system, wherein in the bus system at least a first communication phase and a second communication phase are used for the exchange of messages between the at least one user station and the at least one other user station of the bus system,
  - a receive module configured to receive the signal from the bus, the receive module being configured to generate for the communication control device a digital receive signal from the signal received from the bus, and
  - a communication module configured to determine communication standards according to which the messages are exchanged between the at least one user station and the at least one other user station of the bus system, wherein the communication module has at least one block with which a communication standard for the transmit module and the receive module is able to be changed from a first communication standard to a second communication standard, so that the transmit module and the receive module are implemented either according to the first communication standard for transmitting and/or receiving the messages or according to the second communication standard for transmitting and/or receiving the messages, and wherein the transceiver is configured to convert the transmit signal into at least one analog transmit signal for sending onto the bus.

15. A method for communicating in a bus system, the method being carried out by a transceiver for a user station of the bus system, the method comprising:

sending, by a transmit module, a transmit signal onto a bus of the bus system, wherein in the bus system, at least a first communication phase and a second communication phase are used for the exchange of messages between the user station and at least one other user station of the bus system;

receiving, by a receive module, a signal from the bus, the receive module being configured to generate a digital receive signal from the signal received from the bus; and determining, by a communication module, communication standards according to which the messages are exchanged between the user station and the at least one other user station of the bus system, wherein the communication module has at least one block with which a communication standard for the transmit module and the receive module is set to a first communication standard or to a second communication standard, so that the transmit module and the receive module operate according to the first communication standard set for transmitting and/or receiving the messages or according to the second communication standard set for transmitting and/or receiving the messages.

* * * * *